United States Patent Office 3,238,040
Patented Mar. 1, 1966

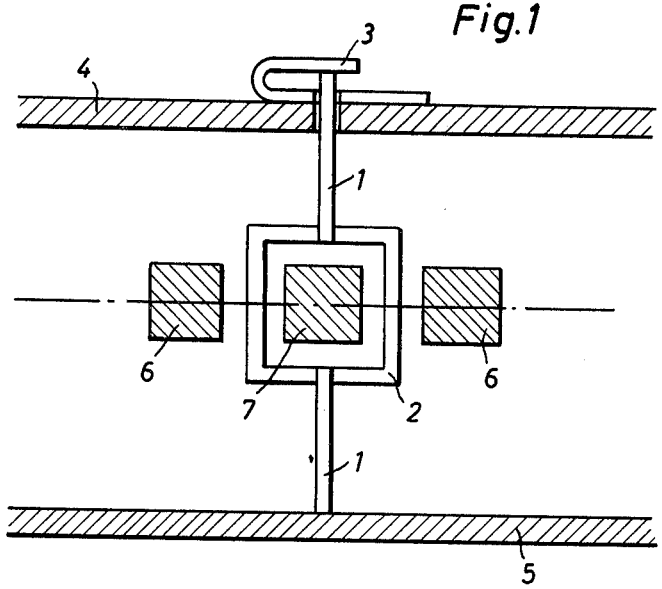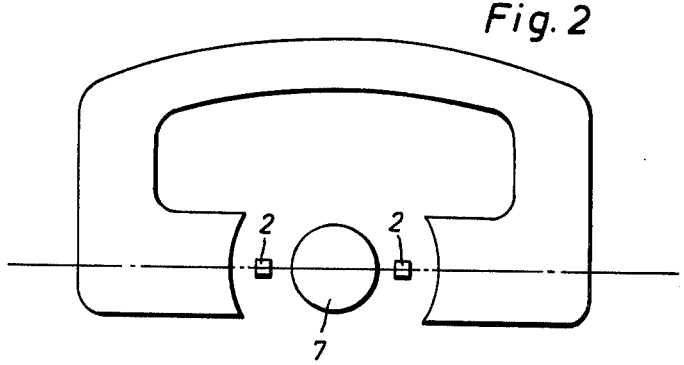

3,238,040
TENSION STRIPS IN MEASURING INSTRUMENTS
AND AN ALLOY FOR USE THEREIN
Alfred Durer, Dusseldorf, and Konrad Ruthardt and
Hermann Speidel, Hanau (Main), Germany, assignors
to W. C. Heraeus G.m.b.H., Hanau (Main), Germany
Filed Dec. 18, 1962, Ser. No. 245,491
9 Claims. (Cl. 75—172)

This invention relates to tension strips in measuring instruments and to an alloy for use therein.

Numerous noble metal alloys, particularly alloys of platinum and alloys of gold with additives of the various types of other noble metals and also base metals are known as material for physical precision instruments. Because of their chemical and mechanical resistance, these alloys have been used for a large variety of different parts of the physical precision instruments. For measuring instruments with a rotatable meter mechanism, in which the mechanism is at the present time very often fixed in its position by tension strips as well as by point suspensions, platinum-iridium alloys with an iridium content up to 30% and platinum-nickel alloys with a nickel content of 8 to 12.5% have up to now preferably been used as the material for these tension strips.

Various types of different requirements or standards are demanded in such tensioning strips. Thus, a high resistance to corrosion of the strip is essential for the life of the measuring instrument. In order to position the measuring instrument economically in the meter the material should have a good capacity for soldering and be able to be positioned without the necessity of employing time-wasting auxiliary means and without the use of corrosive fluxes. The elastic distortion of the strips should be as low as possible in the interest of good measuring accuracy. Nevertheless, the alloy must be capable of being satisfactorily deformed in order to permit the production of strips of comparatively large width and small thickness.

These conditions have already been largely satisfied by the aforementioned alloys. A study of their properties did however show that they impose limits on the construction of measuring instruments with a rotatable meter mechanism, which can surprisingly be substantially obviated by simple technical means.

The up-to-date objective in design of measuring instruments is the construction of meter mechanisms with low torques, the tensioning band of which is under strong tension in order to make them insensitive to inclination and vibrations. The construction of such measuring instruments using the prior known alloys, is limited by the fact that the tension of the strips cannot be further increased with a certain torque, which must not be exceeded in order to produce a sufficient measurement sensitivity. It has now been found that certain gold alloys make possible a major technical advance in this field. This followed from the investigation of certain mechanical properties as described below.

The high elastic limit and the low torsional modulus principally decide the quality of an alloy used for tension strips. These two conditions determine the maximum loading capacity of a tensioning strip at a predetermined permissible torque. The tension strips are generally used in a stiffened form, but when considering the suitability of a material for tension strips, it is also possible to take into account its tensile strength instead of the elastic limit, since this strength value is near the elastic limit with stiffened materials. It was also found that the tensile strength of the material divided by the root of the torsional modulus is of decisive importance from the point of view of the suitability of a material as a tension strip. This value of $$Z = \frac{\delta_B}{\sqrt{G}} \quad (\delta_B = \text{tensile strength}$$

$G$ = torsional modulus), ascertainable from values which can easily be measured, gives a relative standard as to the amount to which a tension strip of a certain torque can be tensioned in its main direction.

It has now been found that gold alloys with 1 to 70% of at least one metal of the VIII group of the periodic system, the balance, at least 20%, being gold, can be used as material for tension strips in measuring instruments with rotatable meter mechanism to provide surprising technical advantages in this particular field.

As metals of the VIII group, there are to be considered metals of the platinum group, in particular platinum, palladium, iridium and rhodium, as well as base metals of the VIII group such as iron, cobalt and nickel. The metals of the platinum group may advantageously be used in a quantity of 1 to 30% and the base metals in a quantity of 5 to 40%.

Whereas the platinum alloys hitherto used as material for tension strips had Z-values of 1.3 to 1.4 when calculated from the tensile strength and torsional modulus, the alloys used according to the invention have Z-values which are higher than 1.5 and in particular higher than 1.7 and may for example even reach 2.5. These high values result from the properties which are essential for tension strip materials and which are extremely favourable in the case of the present alloys, namely, a high tensile strength and a low torsional modulus of the alloys. The alloys likewise have the additional properties necessary for materials used for tension strips, such as high resistance to corrosion, good solderability and deformability and a low elastic distortion.

Alloys which have proved especially suitable are those consisting of 40 to 80% gold and the remainder iron or cobalt or in particular nickel; in this case, the proportion of gold above 40% can be replaced by platinum metals.

Alloys which are particularly advantageous in practice are those which contain, in addition to gold, up to 40% and advantageously up to 30% of one or more platinum metals, that is to say, for example, alloys which consist of 10 to 40% of platinum, 10 to 40% of nickel, the balance being at least 40% of gold.

With many of the said alloys, it is possible to obtain an improvement in their properties, particularly the tensile strength and thus an increase in the values for Z, by thermal tempering, for example with gold-platinum or gold-rhodium alloys.

Examples of alloys according to the invention which are suitable for use as tension strip materials in measuring instruments with a rotatable meter mechanism are given below:

| Alloy composition | Tensile strength, kg./mm.$^2$ | Torsion modulus, kg./mm.$^2$ | Z-value |
|---|---|---|---|
| 1. 50 Au 50 Ni | 141 | 5,300 | 1.94 |
| 2. 65 Au 35 Ni | 180 | 5,070 | 2.52 |
| 3. 35 Au 65 Ni | 168 | 7,150 | 1.99 |
| 4. 60.15 Au, 39.7 pt, 0.15 Rh tempered | 117 | 4,200 | 1.80 |

The alloys set out in the table have proved particularly suitable for use as materials for tension strips in measuring instruments having a rotatable meter component. They conform to all mechanical requirements, such as those set out above as being desirable, and also have in addition the other properties which, as explained above, are required of tension strips. By comparison with the alloys hereinbefore described and known for the purpose, they provide a major technical advance which makes possible the development of new types of measuring instruments.

In addition to the use for tension strips for electrical measuring instruments, such as rotating coil instruments and soft iron instruments, the said alloys are also particularly suitable for use as tension strip materials in measuring instruments of a different type with a rotatable system, such as torsion balances.

A measuring instrument with a rotatable meter mechanism and using a tension strip of the material according to the invention is shown by way of example in the accompanying drawing.

Referring to FIG. 1 of the drawing, which is a side elevation of such a measuring instrument it will be seen that this consists of a tension strip 1, a loop 2 of the rotatable meter component and a tension spring 3. The tension strip is supported between an upper support 4 and a lower support 5. The magnet of the instrument is shown at 6 and the magnetic core at 7. In FIG. 2, the magnet 6, magnet core 7 and loop 2 of the measuring instrument are shown in section.

Percentages herein are weight percent.

We claim:
1. In a measuring instrument having a turnable element for indicating the value sensed, said turnable element being mounted for said turning thereof by tension means for maintaining the turnable element under tension, the improvement which comprises said element being formed of an alloy consisting essentially of at least one metal of group VIII of the periodic system and gold in the proportion of 30–80% gold, balance group VIII metal, the ratio of Z of the tensile strength to the root of the torsional modulus ($\sqrt{G}$) being at least 1.5.
2. Instrument according to claim 1, wherein said group VIII metal is selected from the group consisting of iron, cobalt, nickel, platinum, palladium, rhodium, and iridium.
3. Instrument according to claim 1, the alloy including about 40–80% of gold, a metal of the platinum group in amount of up to about 40% with the proviso that the sum of the gold and platinum group metal does not exceed 80%, the balance being metal selected from the group consisting of iron, cobalt and nickel.
4. Instrument according to claim 1, the alloy including about 1–30% of metal of the platinum group.
5. Instrument according to claim 1, the alloy including from about 5–40% of a metal selected from the group consisting of iron, cobalt, and nickel.
6. A measuring instrument having as an operating element a strip maintained under tension and turnable for performing its operating function, said strip being formed of an alloy consisting of about 10–40% platinum, about 10–40% nickel, the balance gold, the gold content being at least about 40%.
7. A measuring instrument having as an operating element a strip maintained under tension and turnable for performing its operating function, said strip being formed of an alloy consisting of about 30–70% gold, the balance platinum.
8. A measuring instrument having as an operating element a strip maintained under tension and turnable for performing its operating function, said strip being formed of an alloy consisting of about 30–70% gold, about 0.1–3% of a platinum metal other than platinum, and the balance platinum.
9. Measuring instrument according to claim 8, the said platinum metal other than platinum being rhodium.

References Cited by the Examiner

UNITED STATES PATENTS

| | | | |
|---|---|---|---|
| 1,165,448 | 12/1915 | Richter | 75—172 |
| 1,680,598 | 8/1928 | Dreaper | 75—165 |
| 1,926,213 | 9/1933 | Picard | 75—165 |
| 1,946,231 | 2/1934 | Nowack | 75—165 |
| 2,897,443 | 7/1959 | Mendelsohn et al. | 324—97 |

FOREIGN PATENTS

| | | |
|---|---|---|
| 1,099,177 | 2/1961 | Germany. |
| 1,106,966 | 5/1961 | Germany. |
| 1,127,091 | 4/1962 | Germany. |

OTHER REFERENCES

"The Platinum Metals and Their Alloys" by R. F. Vines, published by the International Nickel Company, New York, N.Y. Copyright 1941, 141 pages.

DAVID L. RECK, *Primary Examiner.*

WINSTON A. DOUGLAS, *Examiner.*

UNITED STATES PATENT OFFICE
CERTIFICATE OF CORRECTION

Patent No. 3,238,040                          March 1, 1966

Alfred Durer et al.

It is hereby certified that error appears in the above numbered patent requiring correction and that the said Letters Patent should read as corrected below.

Column 3, line 41, strike out "of", first occurrence.

Signed and sealed this 17th day of January 1967.

(SEAL)
Attest:

ERNEST W. SWIDER
Attesting Officer

EDWARD J. BRENNER
Commissioner of Patents